B. M. ASLAKSON.
GAS ENGINE.
APPLICATION FILED DEC. 14, 1905.

1,104,337.

Patented July 21, 1914.
11 SHEETS—SHEET 6.

WITNESSES
Leopold Lei
Wm Bodge

INVENTOR
Baxter M. Aslakson
PER
Frank W. Ashley
ATT'Y

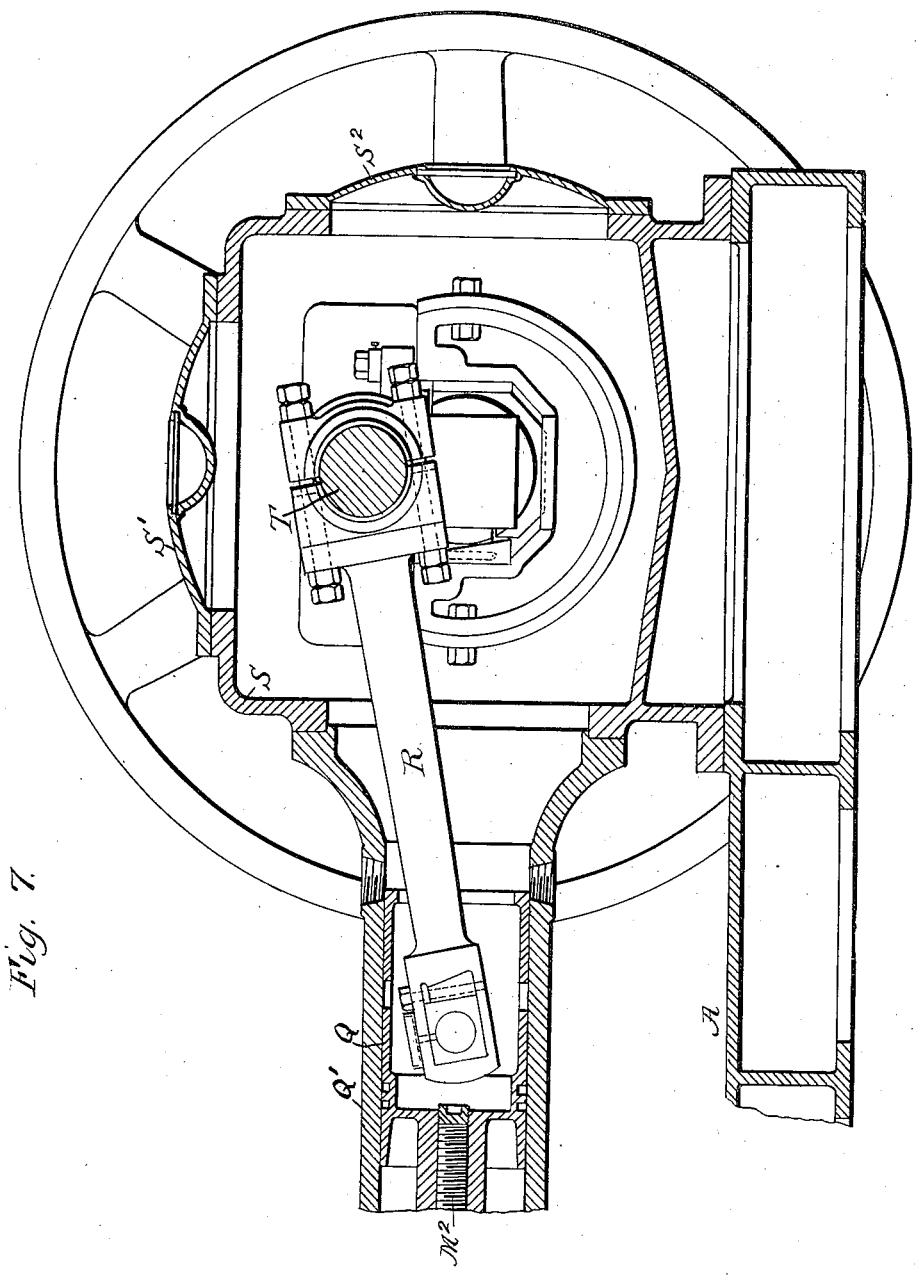

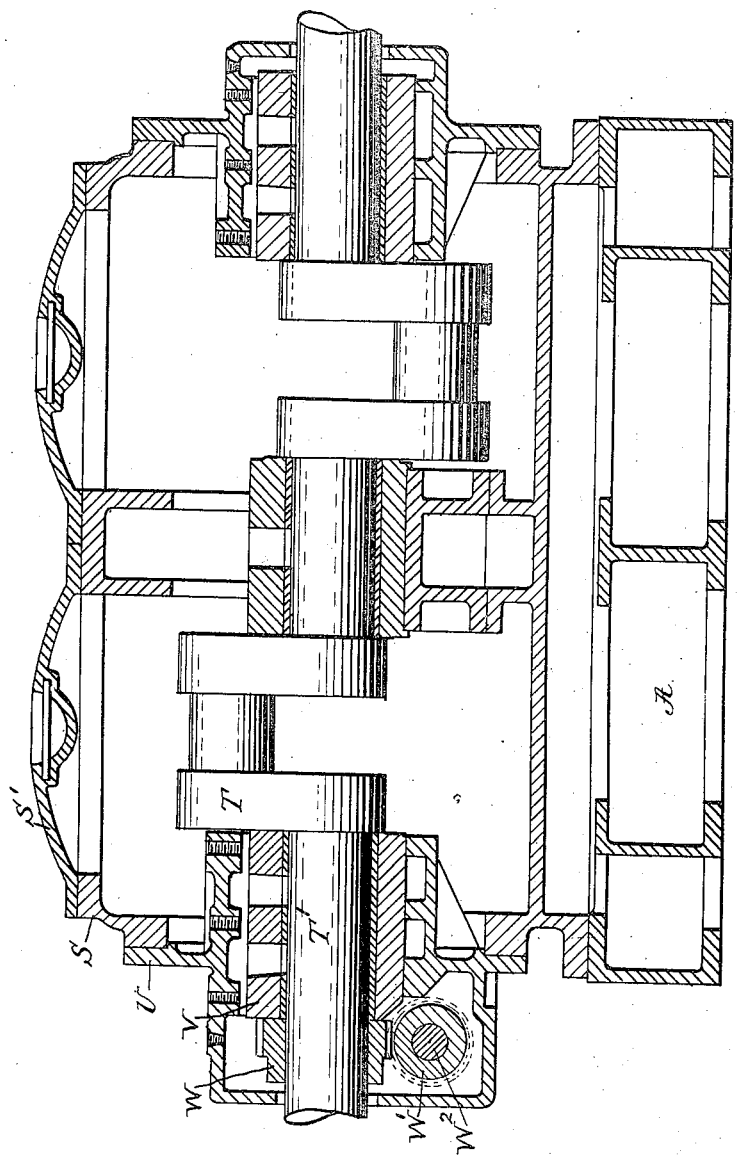

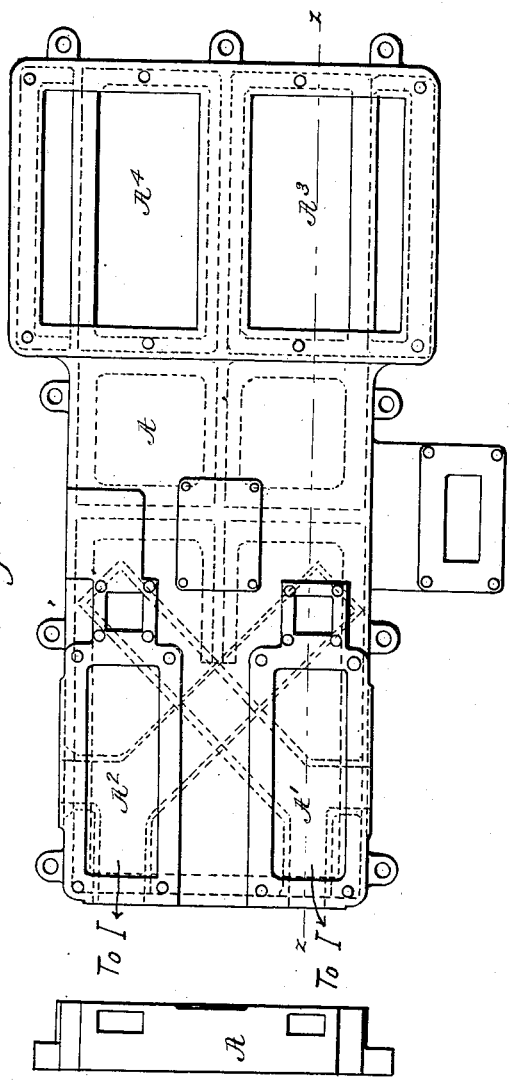

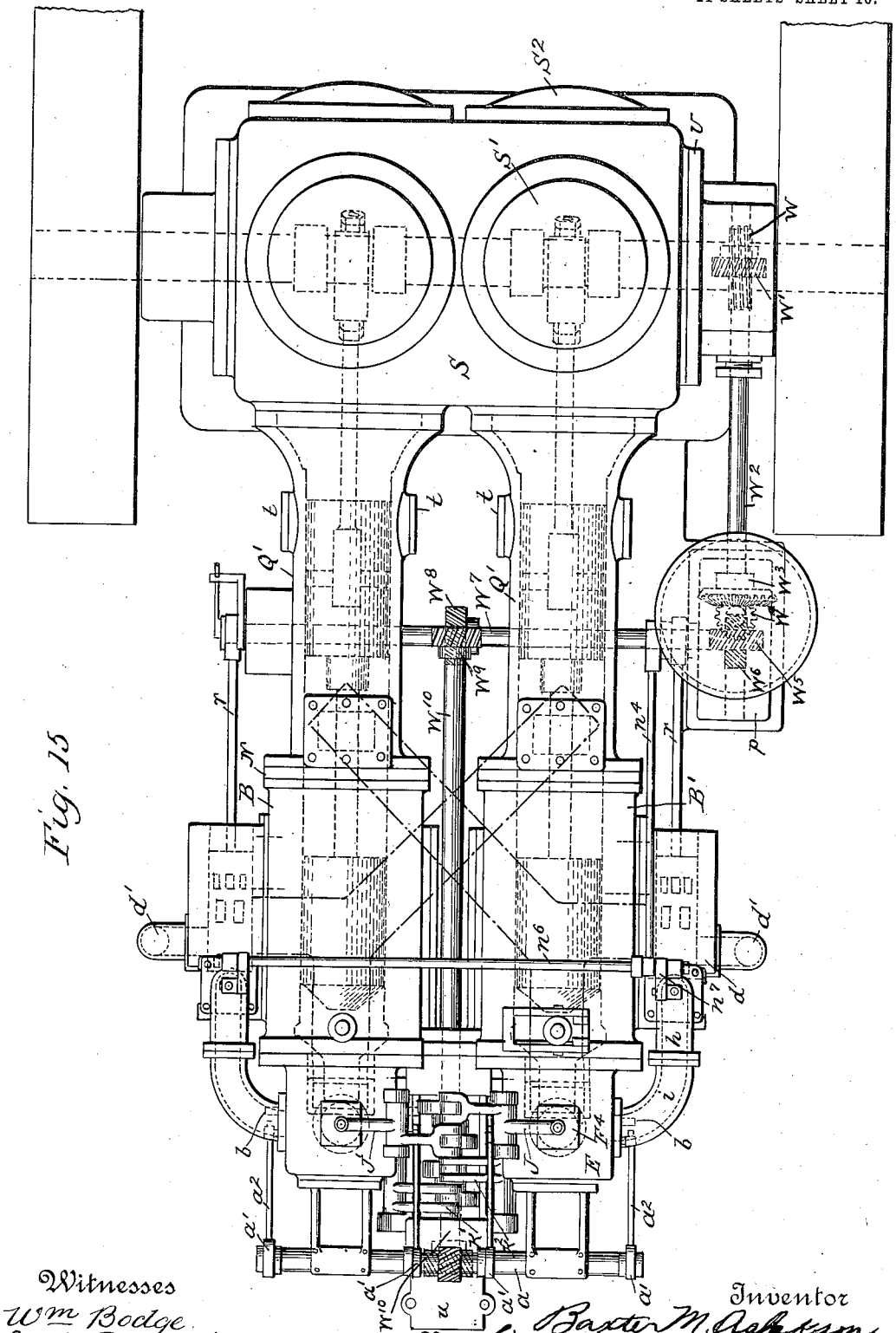

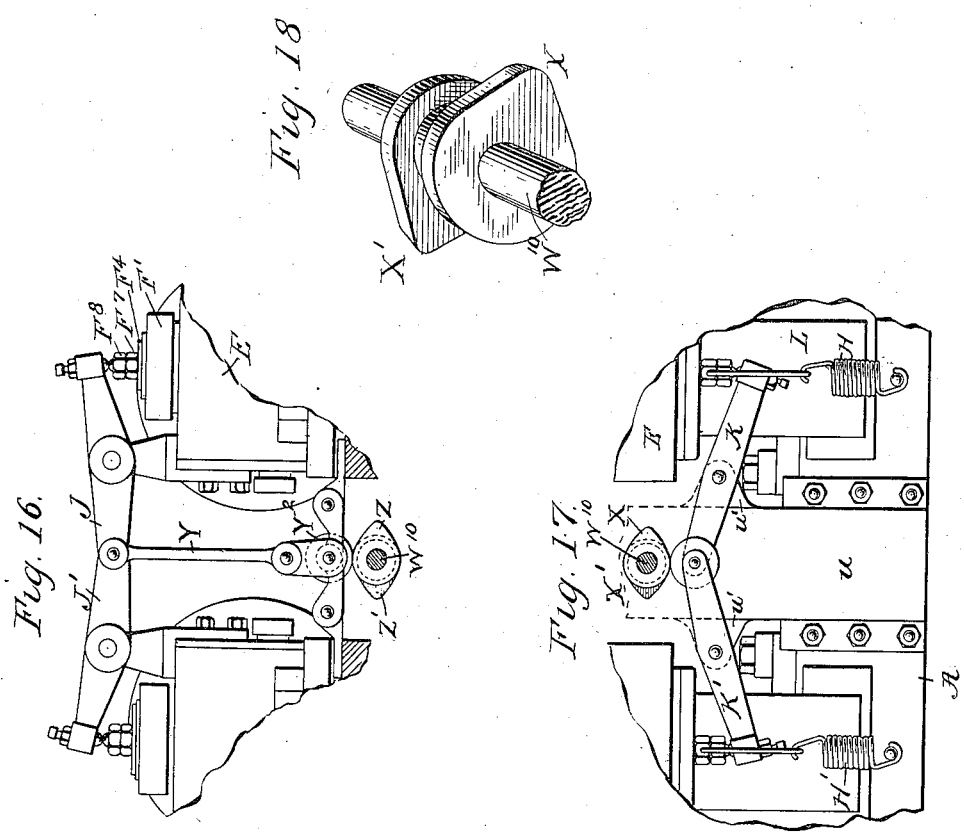

UNITED STATES PATENT OFFICE.

BAXTER M. ASLAKSON, OF SALEM, OHIO.

GAS-ENGINE.

1,104,337.

Specification of Letters Patent.

Patented July 21, 1914.

Application filed December 14, 1905. Serial No. 291,673.

*To all whom it may concern:*

Be it known that I, BAXTER M. ASLAKSON, a citizen of the United States, and resident of Salem, in the county of Columbiana and State of Ohio, have invented certain new and useful Improvements in Gas-Engines, of which the following is a specification.

The present invention relates to gas engines and particularly to that type in which the air and gas is supplied under pressure to the cylinders of the engine.

The object of the invention is to provide a duplex engine of this type having the cylinders placed side by side and so arranged that the air used in one of the cylinders may be supplied by mechanism of the opposite engine, and vice versa.

A further object is to provide efficient means for governing the supply of gas to the engine according to its load so that the engine will run at a constant rate of speed and also to provide an engine that will operate with a high degree of economy in fuel consumption and the mechanism of which will be simple and compact for a given power developed.

A further object is to provide means whereby the burned gases may be all ejected from the engine cylinders so that the new fuel mixture will contain none of the products of combustion resulting from the previous charge.

Figure 1:
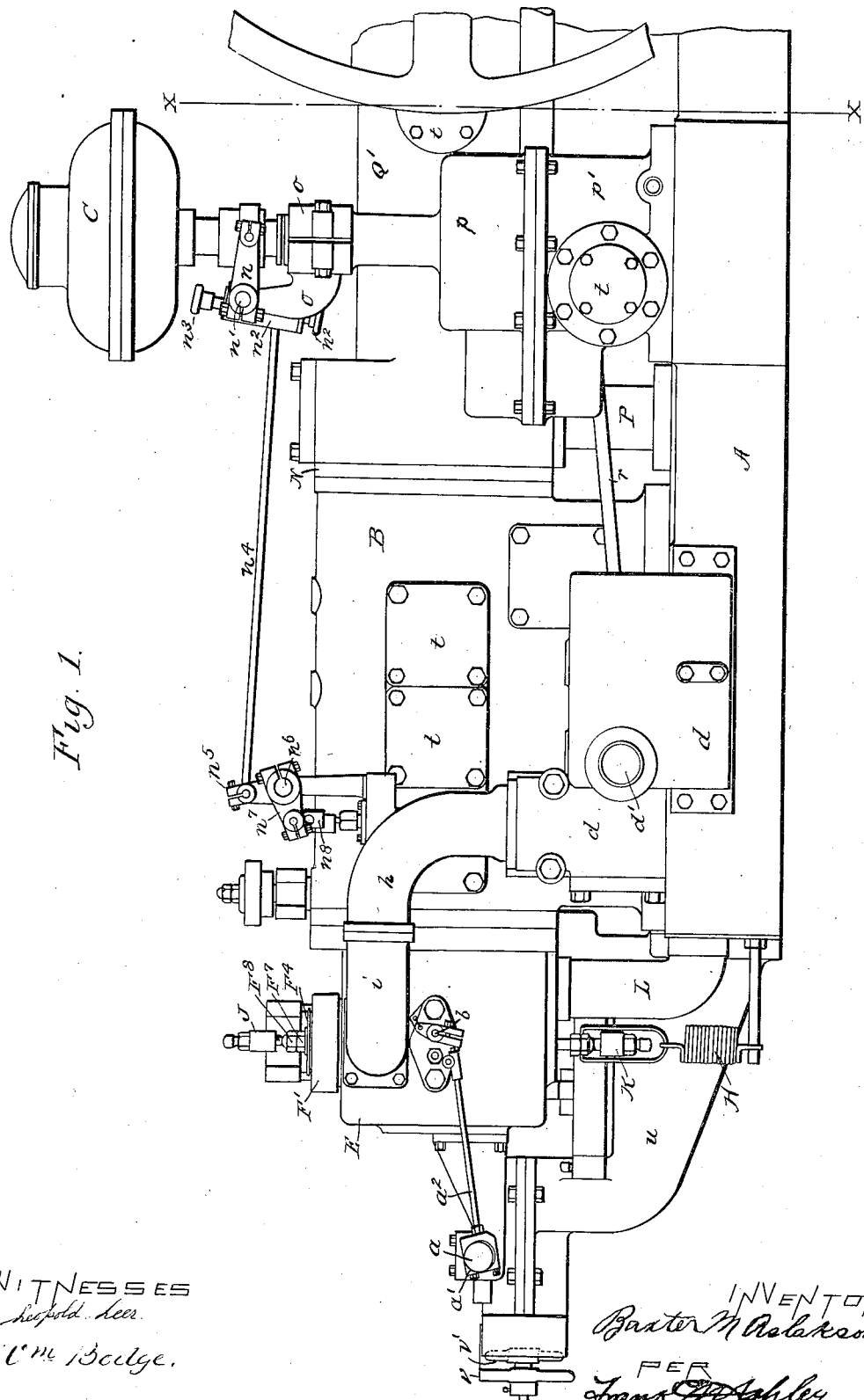
Figure 2:
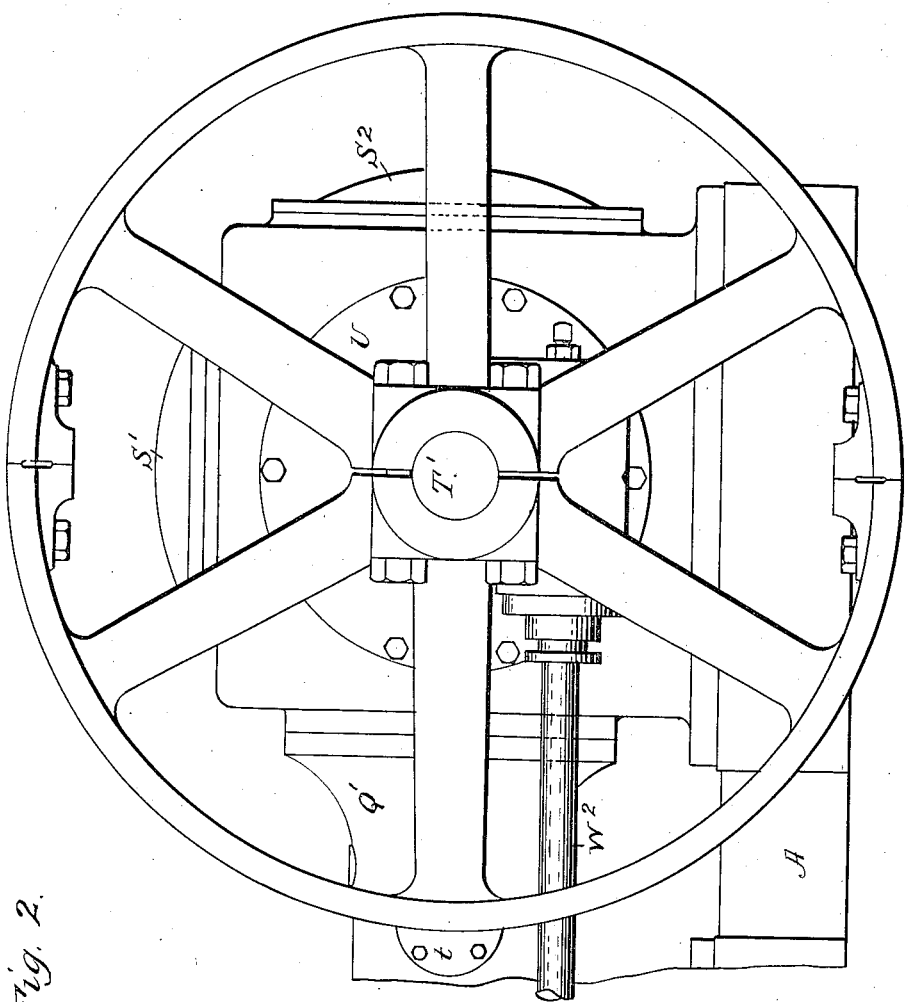
Figure 3:
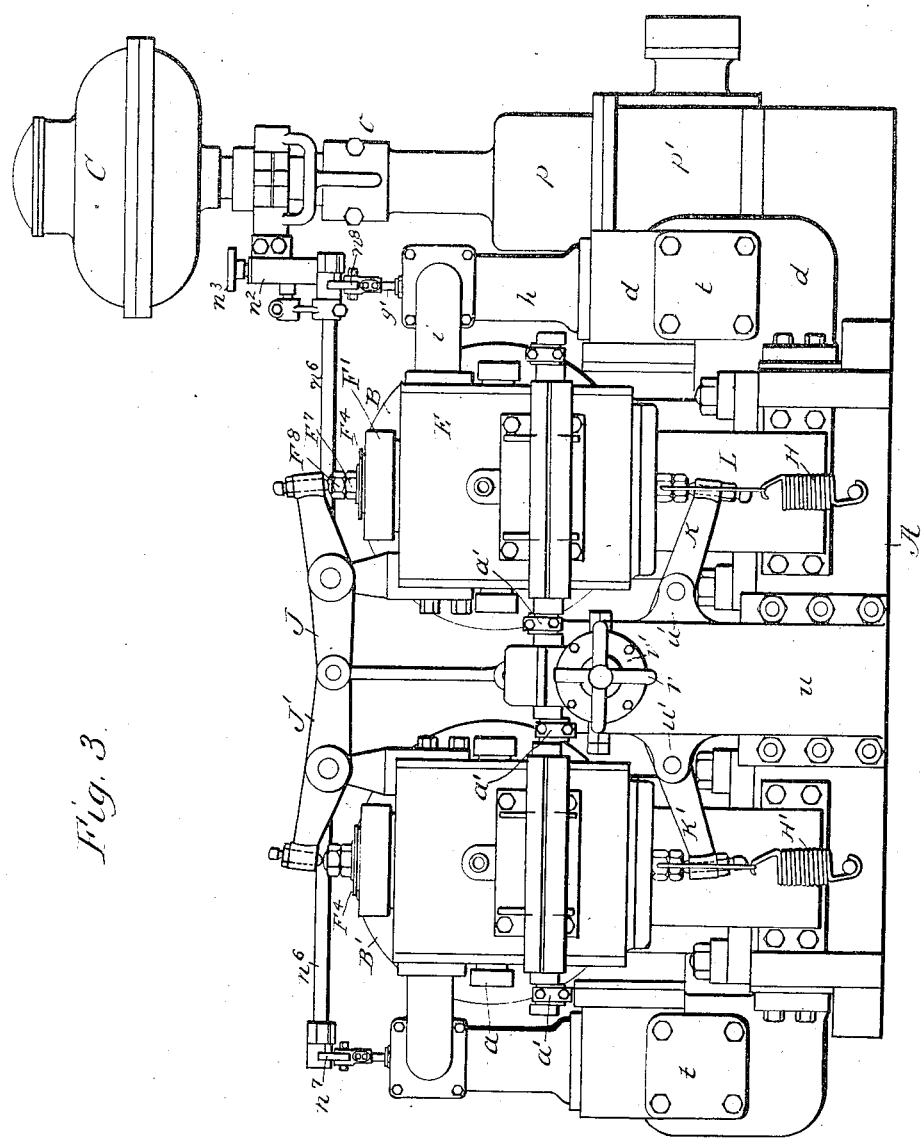
Figure 4:
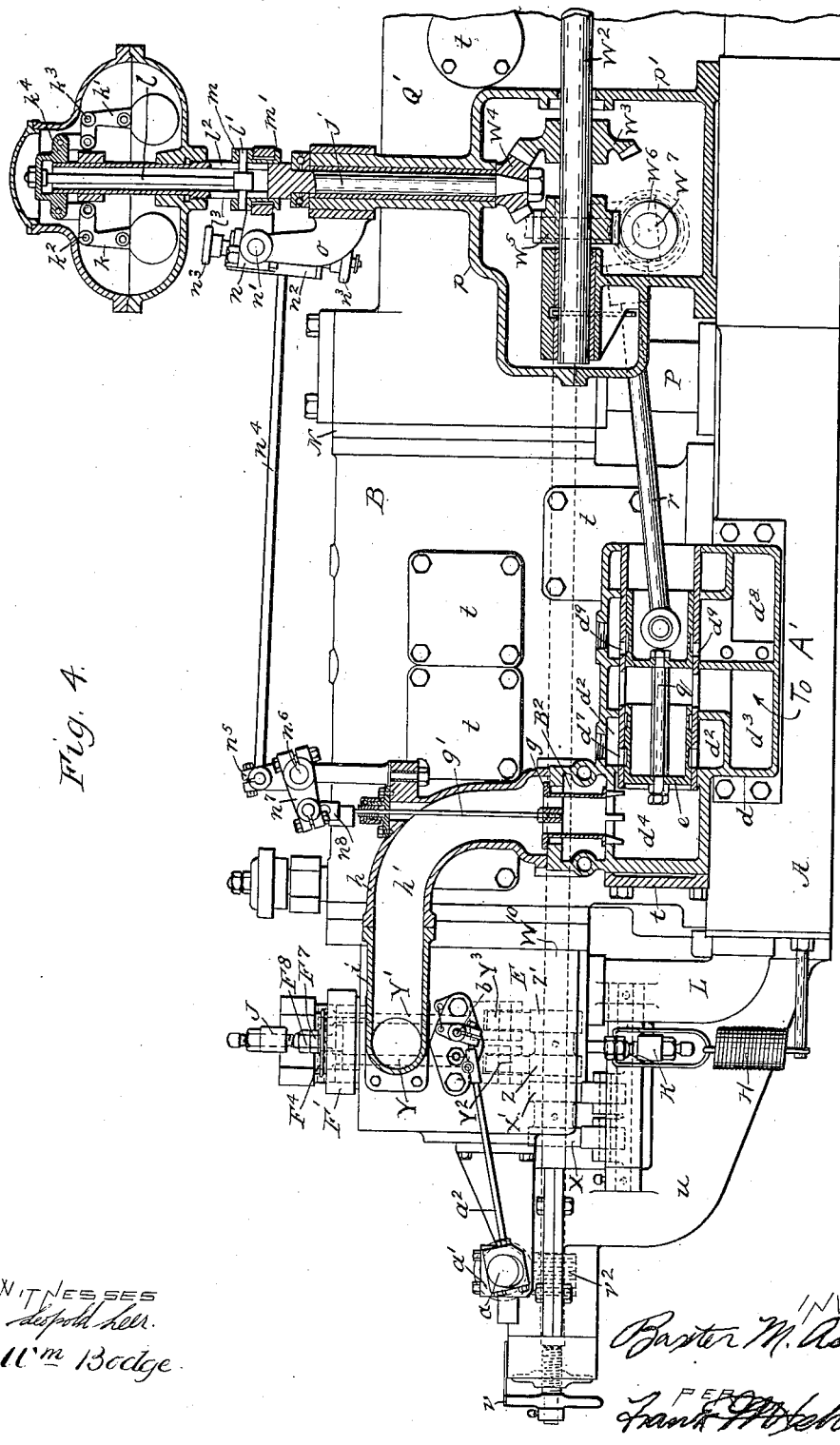
Figure 5:
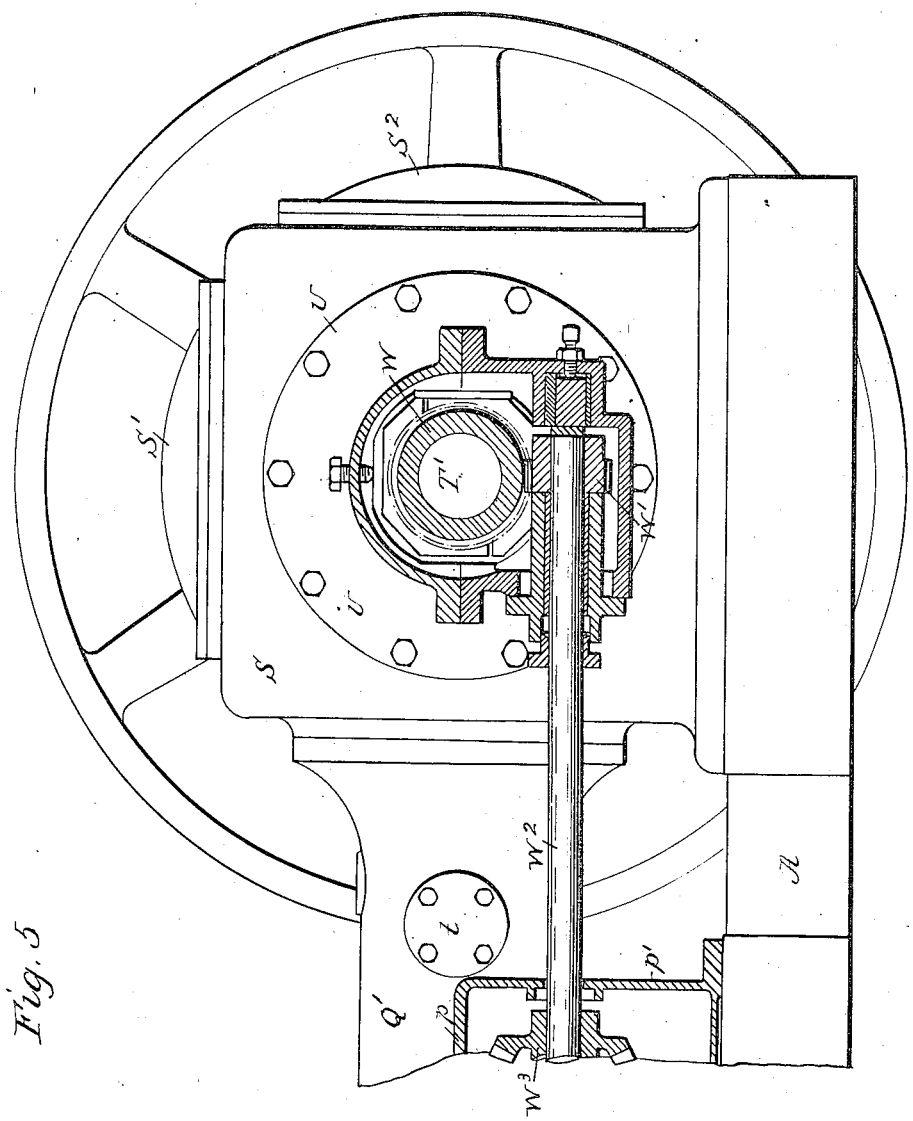
Figure 6:
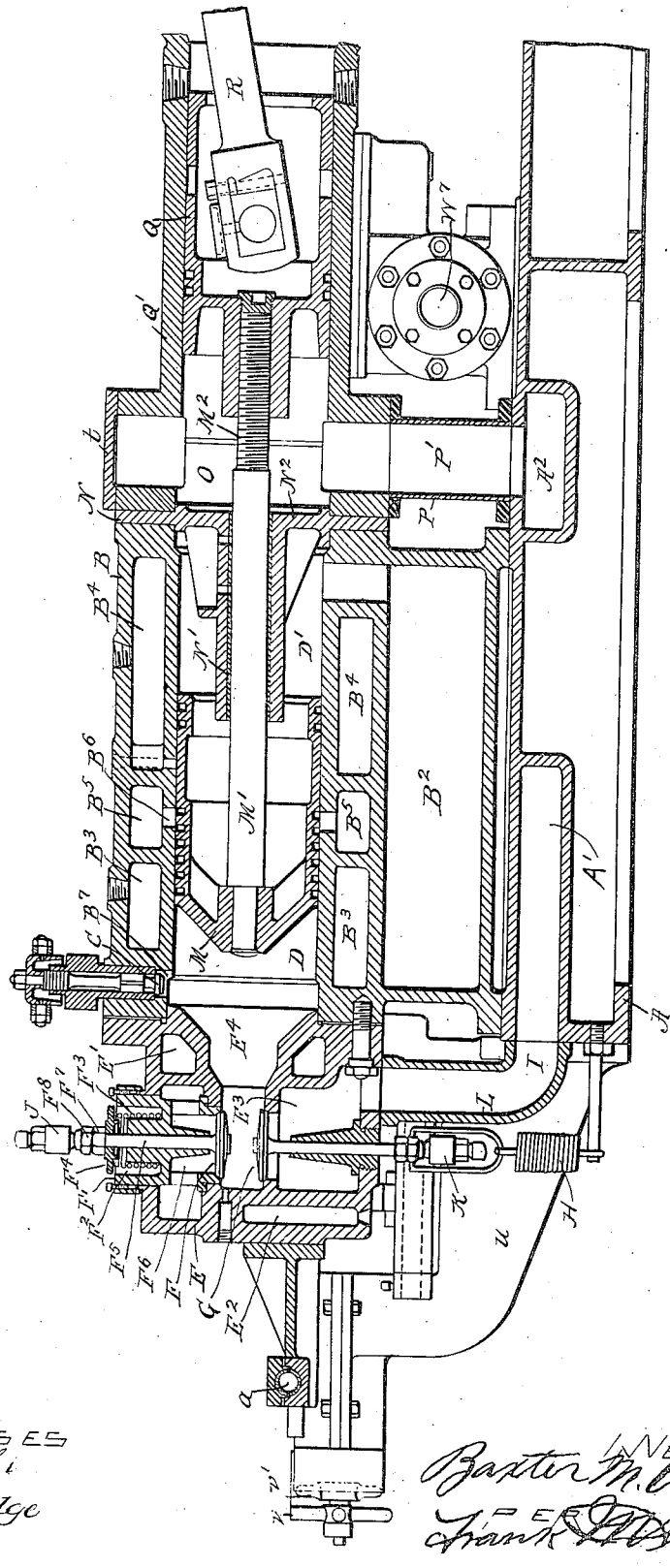

Referring to the drawings which form part of this specification, Figure 1 is a side view showing the general plan of construction up to the line $x-x$ and Fig. 2 is a side view of the crank end of the engine; the drawing being divided in order that the views might be made sufficiently large so that the several parts may be clearly shown. Fig. 3 is a view from the rear end, showing the valve levers and general arrangements of parts. Fig. 4 is a side view showing the gas valves and conduit and governor in section. Fig. 5 is a side view of the crank end of the engine showing a continuation of the section through one of the main bearing boxes and one of the power transmission shafts. Figs. 6 and 7, conjointly present a longitudinal view through one of the engines, showing the air and gas valves, main piston, air compressor piston, connecting rod and crank and their general relative proportions. Fig. 8 is a cross sectional view through the crank casing, showing the two cranks and the main shaft bearings. Fig. 9 is a drawing on a reduced scale showing the bed plate of the engine with the air conduits therein indicated by dotted lines. Fig. 10 is an end view of Fig. 9. Fig. 11 is a sectional end view of the opposite end of the bed plate. Fig. 12 is a sectional view of the bed plate where the conduits cross each other. Fig. 13 is a cross sectional view of the bed plate on the line $z-z$ of Fig. 9. Fig. 14 is a side view of the exterior of the bed plate. Fig. 15 is a diagrammatical plan view of the engine showing the transmission shafts operated from the main shaft, whereby the valves and governor are operated. Fig. 16 is a rear sectional view illustrating the cam and lever arrangement for operating the gas inlet valves. Fig. 17 is a rear sectional view illustrating the cam and lever arrangement for operating the air inlet valves. Fig. 18 is a perspective view of the cam construction.

The engine is built so as to present substantially two similar parts consisting of a cylinder, piston, connecting rod, etc. The engine is of the two cycle type and is so arranged that the air used in the cylinders is furnished by two air compressors which are built one for each cylinder and so arranged that the air compressor adjacent to one cylinder furnishes the supply for the other cylinder, and vice versa.

Since the state of the art is such that engines of this character, and their parts are so well known, I will endeavor to describe the construction and operation in as short a manner as possible, leaving those parts which are well known to the art by simply stating them and will endeavor to point out clearly the new features of construction and the advantages derived therefrom.

A indicates the bed plate (see Fig. 9) on which the cylinders and other parts are mounted. The cylinders B and B' are mounted directly over the conduits A' and $A^2$, and are secured to the bed plate by stud bolts in the usual manner. The crank casing is mounted on the bed plate at $A^3$ and $A^4$, so that the engine is entirely self contained. The cylinder B (see Fig. 6) is provided with a chamber $B^2$ which is located in the lower portion thereof, and acts as a reservoir for the fuel gas. Surrounding the cylinder B are the usual water jackets $B^3$ and $B^4$ and the exhaust chamber $B^5$ which latter communicates with the interior of the cylinder by ports $B^6$, etc. The cylinder B, is also provided with a port $B^7$ governed by a valve C, through which compressed air may be introduced into the cylinder chamber D, for the purpose of starting the engine.

A casting E forming the cylinder head is bolted to the cylinder and is provided with the water jackets $E'$ and $E^2$, surrounding two centrally disposed valves, each of which is mechanically operated. The upper valve F controls the inlet of gas to the cylinder chamber D, and the lower valve G controls the supply of air thereto. The valve F is held in a removable casting $F'$ which is provided with the valve seat as shown, and by removing this casting, the valve G may be removed by withdrawing it through the opening thus provided. The casting $F'$ is provided with an annular groove $F^2$, in which is located a spring $F^3$ which bears against the casting at its lower end and against the plate $F^4$ which is connected to the valve rod $F^5$, at its upper end. This spring is normally under sufficient tension to keep the valve F closed in opposition to the gas pressure in the chamber $F^6$. The nuts $F^7$ and $F^8$ are screwed on the end of the valve rod $F^5$ so that when the casting $F'$ is removed, the valve F, etc., are removed with it. The valve G is held to its seat by the spring H, which is set at sufficient tension to keep it normally closed against the air pressure in the conduit I. The valves F and G are mechanically operated by the levers J and K respectively. Connecting the castings E and A, is a casting L which serves as an air conduit to convey the air from the conduit in the base plate A to the chamber $E^3$ in the casting E.

In the cylinder B is a piston M having its end face conical in form, which end corresponds with the cone shaped opening $E^4$ in the cylinder head. This form assists in the distribution and exhaust of the gases. The piston rod $M'$ passes through a stuffing box $N'$ formed in the casting N, serving as a cylinder head $N^2$ for the air compressor cylinder O, and the gas compressing end $D'$ of the cylinder B. The casting $Q'$ is provided with the cylinder O in which is located the air compressor piston Q which serves also as a cross head for the connecting rod R. The pistons M and Q are connected by the piston rod $M'$ and provision for their adjustment relative to each other is provided and consists of the screw thread $M^2$. The cylinder O is connected to the base A by the casting P which forms a conduit $P'$ to conduct the air to the conduit $A^2$ in the base A. The casting $Q'$ is connected to the crank case S in which the crank T is located (see Fig. 7). The crank case S is provided with hand hole plates $S'$ and $S^2$ for the purpose of inspection, etc.

Secured to the casting S is a casting U (see Fig. 8) which serves as a housing and support for the main bearing V which is removably secured thereto. Within the casting U and secured to the main shaft $T'$ is a worm gear W which transmits the power through the gearing $W'$, $W^2$, (see Figs. 4, 5 and 15) $W^3$ and $W^4$ to drive the governor and is geared also through gearing $W^5$, $W^6$, $W^7$, $W^8$, $W^9$ to drive shaft $W^{10}$, on which the inlet valve cams X, $X'$, Z and $Z'$ are mounted, shown in dotted lines in Fig. 4.

Referring to Figs. 16, 17, and 18, the cams X and $X'$ operate the levers K and $K'$ which open the air inlet valves of the opposing engines. The cams Z and $Z'$ shown in dotted lines in Fig. 4 operate the gas inlet valves F on the engines. All of the said cams are mounted on and driven by the shaft $W^{10}$ and the cams so adjusted that they will operate the valves of the two engines alternately as the engines' pistons travel in opposite directions relative to each other. The cams transmit the power to the levers through the rods Y and $Y'$ and the lower ends of the said rods are bifurcated and provided with rollers $Y^2$ and $Y^3$ to prevent wear etc.

Driven by worm gear by the shaft $W^{10}$ is a shaft $a$, provided with eccentrics $a'$ by means of which the spark contacts are operated by movement transmitted through the rods $a^2$ to the spark plugs $b$.

Secured by bolts to the bed plate A and cylinders B and $B'$ is a casting $d$ which is provided with chambers through which the air and gas flow on their way to the engine cylinder.

$d'$, (Fig. 1) is the inlet for gas from the gas generator to the chamber $d^2$, (see Fig. 4) whence it flows first into the chamber $d^4$ on its way to chamber $B^2$ into which it is drawn and then compressed by the piston M, as will be hereinafter more fully set forth. The chamber $d^3$ is in open communication with the conduit I in the casting L through the branched end of conduit $A'$ as is clear from Figs. 4, 6, 9, and 10. The air is drawn into this chamber and over to the air compressor of the other engine, by the compressor piston by way of the conduit $A'$ shown in Figs. 9 and 10.

Fitted in the casting $d$ is a cylinder which is provided with ports which are controlled by the slide valve $e$. This valve controls the ingress of both the air and gas to the compressors but the gas is further controlled by the governor valve $g$ and inlet valve F as hereinafter set forth.

$h$ and $i$ are castings provided with a conduit $h'$ through which the gas flows to the valve F after passing the governor valve $g$.

The valve $g$ is controlled by the governor which is driven from the gear $W^4$, and transmits its movements through the shaft $j$ to the governor balls which are suspended by bell crank levers $k$ and $k'$ which are fulcrumed at $k^2$ and $k^3$ respectively, and in their outward movement draw down the cap piece $k^4$ by which the rod $l$ is depressed which in turn operates the cylindrical sliding element $m$ which is provided with an annular groove $m'$. The rod $l$ is connected to said element $m$ by means of a short cross rod $l'$ which projects through slots $l^2$ $l^3$ as shown. Fitted in the groove $m'$ is the end of a casting $n$ which is mounted on a shaft $n'$ which in turn is supported by a bracket $o$ mounted on the casting of the casing $p$.

Secured to the shaft $n'$ is an arm $n^2$ in which is fitted a sliding block provided with a threaded hole, in which engages a threaded rod supported by said arm and having the hand-wheels $n^3$ for raising or lowering the block. Projecting from this block is a rod to which is fitted a casting which casting has provision for engaging the rod $n^4$ which actuates the rocker arm $n^5$ which in turn operates the shaft $n^6$ on which is mounted the arm $n^7$, which is in turn connected to the valve rod $g'$ by means of the link $n^8$. The drawing shows that the casting $n$, is supported near its upper end by the shaft $n'$ so that when the sliding block is lowered in said casting, a greater movement will be imparted to the rod $n^4$ and consequently the valve $g$ may be varied in its lift by altering the position of the block in the casting $n$. Now, since the valve $g$, when in its lowest position, rests on its seats, as shown, the governor mechanism and sliding block must be set so that all the movement will be such as to raise or lower the valve $g$ above its seat to a variable degree but must not at any time be set to lower the valve $g$ below its seat.

The slide valve $e$ is preferably made in two parts which are joined by the rod $q$. It is actuated by the eccentric rod $r$ which is driven by the shaft $W^7$. This valve is so proportioned and adjusted that in its extreme position toward the right, it will open communication between the gas inlet chamber $d^2$ and the chamber $d^4$ and when the valve $g$ is raised, as it always is to some degree when the engine is running, the gas may be drawn into the chamber $B^2$ (see Fig. 6) which is in open communication with the chamber $d^4$ shown in Fig. 4, and the air port $d^9$ is also open from chamber $d^8$ to $d^3$. When the valve $e$ is in its extreme position to the left, the air port $d^9$ is closed and also the gas port $d^7$. The relative positions will be described in the operation hereinafter.

$t$, indicates hand pole plates for purposes of inspection, oiling, etc., $u$ is a casting which is bolted to the base A and is provided with lugs $u'$ from which the levers K and K' are supported, also the end of the shaft $W^{10}$ is supported thereby and the cross shaft $a$ is supported in such a manner that it may be rotated in its bearings to operate the eccentrics thereon.

The hand-wheel $v$, is provided with a threaded stem which engages the internally threaded hub $v'$ secured to the casting $u$, and the inner end of said stem abuts the end of shaft $W^{10}$, on which is secured the worm-wheel $v^2$ for rotating the shaft $a$, which actuates the spark-contacts as previously described. The shaft $W^{10}$ during its rotation has an endwise thrust due to the worm gearing thereon which normally retains it against the stem, and by the rotation of the hand-wheel in opposite directions the shaft may be longitudinally moved backward or forward, which motion produces an independent adjusting movement of the shaft $a$ about its axis by means of the worm gearing to advance or retard the time of ignition.

The drawings are reduced drawings from the working plans and a little care in comparing the several views will give a clear conception of the construction of the engine as a whole.

In describing the operation of the engine as a unit I will designate the near engine as No. 1, and the opposite engine as No. 2.

The drawings show the engines with their pistons at half stroke, and the slide valves $e$ are consequently in the positions shown. Assuming therefore, that the slide valves $e$ of engine No. 1 and No. 2 are in the positions shown in the drawing and that the piston of engine No. 1 is traveling forward on its power stroke and the piston of No. 2 is returning on its compression stroke, it will be seen that the valves $e$ are closed against the admission of both air and gas and consequently the exit thereof through said valves.

We will now follow the admission of both the air and gas from the atmosphere and the gas producer respectively, to the air and gas compressors and thence to the engine cylinders, and the relative positions of the working pistons to the slide valves $e$. The gas is first admitted to the engine through the inlet $d'$, (see Fig. 1) to the chamber $d^2$, (see Fig. 4) and thence through the ports $d^7$ to the chamber $d^4$ when the slide valve $e$ has traveled to the right sufficiently to open the same, and thence by the valve $g$ when the same is lifted, as it is when the engine is running to a more or less degree as more fully hereinafter explained, to the chamber $B^2$, (see Fig. 6) to the gas compressing cylinder D' where it is compressed by the forward movement of the piston M and forced and compressed in the chamber $B^2$ and flows thence through the valve $g$ to the conduit $h'$ (see Fig. 4) to the inlet valve F to the cylinder D of the engine. It must be understood that the slide valve e had closed the ports $d^7$ when the piston M was making its forward stroke. Since engine No. 2 works the same way, its supply of gas being governed by the slide valve on the far side of the cylinder, it will be seen that each engine supplies its own compression of gas for use in its power cylinder. The compressed air, however, is furnished by the air compressor of the opposite engine.

The air is admitted to the engine through the slide valves e from beneath the base plate or bed to the chamber $d^8$ and through the ports $d^9$ to the chamber $d^3$ whence it is drawn by engine No. 2, by way of the conduit A' (see Fig. 9) to the air compressor of the engine, and then compressed by the return stroke (the valve e being closed in the meantime) into the air conduit I of engine No. 1, (see Fig. 6) to the valve G, which opens just as the piston M is ending its power stroke and admits the air which sweeps the burned gases from the cylinder through the exhaust ports $B^6$ to the atmosphere. Immediately after the air is admitted to the cylinder chamber D the gas is admitted through the valve F, and the air and gas are mixed together to form the new charge to be compressed by the return stroke and again ignited for the power stroke. The gas is usually compressed to a slightly greater degree than the air to prevent any possibility of the air flowing into the gas conduit $F^6$ when both valves are open at the same time.

It will be noted that when the admission for the gas is opened, the cylinder is already filled with air at a certain pressure and thereafter the air and gas are admitted simultaneously. It will be clear, therefore, that a comparatively small volume of gas can be introduced into the cylinder and may, therefore, be under considerable pressure. The slide valves e perform the same function that would be performed by a check valve placed in the suction of the air inlet, but it is much more positive in its action as it is driven mechanically in timed relation to the movement of the piston, and cannot stick and does not make the noise in operation that the check valves would make.

It is evident that the governing of an engine of this type must be fairly close, especially if the same is used to drive a dynamo for furnishing light, and this has been accomplished by the use of a balanced cylinder valve, one of which is located in the gas conduit of each engine. These valves, lettered g on the drawing and particularly shown in Fig. 4 are each governed by the governor through the instrumentalities before described. This valve serves two functions, first, that of throttling the gas on its way to the gas compressor, and second, that of throttling the gas on its way from the gas compressor to the cylinder.

Assuming that the engines are working above the speed at which the governor is set to maintain them, the valve g would be almost closed as shown in the drawings, and therefore the gas compressor piston could not draw in a full supply of gas, due to the throttling action of the valve operated by the governor, and also the gas from the gas chamber $B^2$ could not flow freely to the valve F, even though the gas compressor had drawn a full charge of gas into the compressor.

Neither the air nor gas can be compressed in their respective chambers above a predetermined pressure for the reason that as the slide valve e opens, if the pressure in the said chambers is higher than that in the gas producer or the atmosphere, as the case may be, the pistons will not draw any further charge in the compressors, but will simply draw the previous volume into the compressors again, and this would continue so long as no gas passed the valve g which might be closed due to a higher speed than the governor was set for.

The whole construction is simple and durable, and the engine which has been built and is now running, demonstrates its practicability and economy.

It will be understood that the engines are duplicates of each other so far as their operation is concerned but that they work alternately; that is to say that when one of the engines is making its power stroke, the other is making its compression stroke, and that therefore the valves are set to operate the respective engines to accomplish this result.

Having thus described my invention, what I desire to secure by Letters Patent of the United States is,

1. In a gas engine, two parallel combustion cylinders each provided with a piston, and means adapted to transmit the power generated in said cylinders to a main shaft, two gas compressors, two air compressor cylinders placed side by side and rigidly connected with said combustion cylinders, said air compressors, each being provided with a piston working in unison with one of the pistons in the combustion cylinders in alinement therewith and means for adjusting the distance between the piston in the combustion cylinder and the piston in the gas compressor, said air compressor piston serving as a cross-head, and means for admitting first air and then gas to said combustion cylinders, said combustion cylinder pistons being adapted to operate alternately in their power stroke, and valves governed by the governor of the engine and located one in each of the gas conduits and adapted to control the gas to the gas compressors and from the gas compressors to the said combustion cylinders, for the purpose set forth.

2. The combination in a gas engine, of a pair of parallel cylinders arranged side by side, air compressors and gas compressors formed adjacent to the ends of each of said cylinders, said air compressors comprising a piston which works in unison with one of the pistons in the combustion cylinders and in alinement therewith, said air compressor pistons serving as cross heads for the engine, means for regulating the distance between the piston in the combustion chamber and the piston in the air compressor cylinder and independent conduits connecting the compression chamber of each cylinder with the inlet port of the combustion chamber of that cylinder, and connecting the compressor of each cylinder with the air inlet port of the combustion chamber of the other cylinder.

3. In an internal combustion engine, a working cylinder having its outer end adapted to serve as a combustion chamber, an air compressor formed at the end of the cylinder opposite to the combustion chamber, means for separating the working cylinder from the air compressor, a gas compression chamber, a piston provided with a cone shaped face corresponding with the gas compression chamber, said air compressor comprising a piston working in unison with the piston in the combustion chamber and in alinement therewith, said air compressor piston serving as a cross-head, and means for admitting first air and then gas to said cylinder, and means adapted to govern the amount of gas admitted to the gas compression chamber, and the amount of gas flowing from the gas compression chamber for the purpose set forth.

4. In combination, two parallel working cylinders each having a cone-shaped piston, operating therein, gas compression chambers in which gas is compressed during the working stroke of its piston formed in one end of each cylinder respectively, air compression chambers in which air is compressed during the return stroke of its piston formed at the opposite end of said cylinders respectively, means for separating said air compression chambers from said working cylinders, each compression chamber being provided with a piston rigidly connected to and working in unison with the pistons in said working cylinder, means for delivering said air and gas to the combustion chamber of its cylinder, the gas compressed in the gas compression chamber of that cylinder and the air compressed in the air compression chamber of the other cylinder, a valve for each of said engines, each valve permitting the admission of gas to the gas compression chamber of the one cylinder and the admission of air to the air compression chamber of the other cylinder and conduits located immediately beneath said cylinders between the compression chamber and combustion chamber of the opposite cylinder respectively.

5. In combination, two working cylinders, one end of each being adapted to serve as a combustion chamber and the opposite end thereof adapted to serve as a compression chamber, means for separating the combustion chambers and the compression chambers, each of said compression chambers being provided with an exhaust port and an independent air and gas inlet port, a piston operating in each working cylinder and a piston working in each compression chamber connected to the pistons in the working cylinder, means for regulating the distance between said pistons, and independent conduits located beneath the cylinders for connecting the compression chamber of each cylinder with the inlet port of the combustion chamber of that cylinder and connecting the compressor of each cylinder with the air inlet port of the combustion chamber of the other cylinder.

6. In combination, two working cylinders, each provided with a cone-shaped cylinder-head forming a combustion chamber, pistons provided with a cone-shaped face operating therein, an air compression chamber in alinement with said combustion chamber and means for separating said work cylinder and air compression chamber comprising a stuffing-box secured to the cylinder, piston in the air compression chamber rigidly connected with the piston in the working cylinder, and means for conducting the air from the compression chamber to the combustion chamber, as and for the purpose set forth.

7. In combination, a gas engine comprising two portions, each having a working cylinder, a piston provided with a cone-shaped surface operating therein, air compression chambers adjacent to the working cylinder and separated therefrom by means comprising a stuffing box secured to said working cylinder, means for delivering to the combustion chamber of each cylinder, the gas compressed by the compressor adjacent to said cylinder and the air compressed by the compressor adjacent to the other cylinder, a governor, and two slide valves operated by the governor, each slide valve serving to control the admission of air to one of the air compressors and the admission of gas to one of the gas compressors.

8. In an internal combustion engine, a bed plate having conduits formed therein, two working cylinders having independent gas and air inlet ports secured immediately over the conduits in said bed plate, valves controlling said ports, a piston operating within said cylinder, air compressors formed at one end of said cylinders, a partition dividing said working cylinders from said air compressors, a piston operating within said cylinder and pistons operating within said air compressors and connected to said first mentioned pistons, a shaft intermediate said cylinders and means in engagement with said shaft for operating said pistons.

9. In combination, two horizontally disposed parallel working cylinders, two gas compression chambers formed at one end of said working cylinders, one associated with each working chamber, two air compression chambers formed at the opposite end of said working chambers from the gas compression chambers, one associated with each working chamber, a piston in each working chamber, means whereby gas is compressed in the gas compression chamber during one stroke of the corresponding piston and whereby air is compressed in the air compression chamber during the return stroke of the piston, conduits provided beneath the working chambers for delivering to each combustion chamber the gas compressed in the corresponding gas compression chamber and the air compressed in the air compression chamber associated with the other cylinder, and a valve adapted to open so as to admit substantially simultaneously the air to one air compression chamber and the gas to the other gas compression chamber.

10. In combination, two horizontally disposed parallel working chambers, two gas compression chambers provided with a cup-shaped end surface, one associated with each working chamber, two air compression chambers formed at the opposite end of the working chamber, from the gas compression chambers, one associated with each working chamber, a partition comprising a piston stuffing-box rigidly secured to the end of the working chamber and separating the air compression chambers from the working chambers, a piston in each working chamber, a piston in each air compression chamber working in unison with the pistons in the working chambers and in alinement therewith, means whereby gas is compressed in the compression chamber during one stroke of the corresponding piston and means whereby the air is compressed in the air compression chamber during the return stroke of the piston, conduits formed in the engine bed beneath the working chambers for delivering to each combustion chamber the gas compressed in the corresponding air compression chamber, associated with the other cylinder, two sliding valves, each sliding valve serving to control the admission of the air to the air compression chamber associated with one working cylinder and admitting gas to the gas compression chamber associated with the other cylinder, substantially as described.

11. In an engine of the character described, two parallel working cylinders having a gas compression chamber formed at one end and an air compression chamber at the opposite end respectively, a piston against which the fuel gases expand on one side and generate power, the opposite side of which is arranged to compress gas at a pressure above that of the atmosphere, air compressor pistons rigidly connected to the first named piston by an intermediate adjustable piston rod, means for conducting to each working chamber associated therewith, and the air compressed in the air compression chamber associated with the other working chamber, as and for the purpose set forth.

12. In a gas engine, two parallel combustion cylinders, each provided at one end with a gas compression chamber and at the opposite end with an air compression chamber, a piston provided with a cone-shaped face arranged, one in each of said working cylinders, a piston arranged one in each of said air compressors, means for connecting the pistons in the air compressors with the piston in the working chamber, a valve for each of said cylinders, each valve permitting the admission of gas to the working cylinder, to the gas compression chamber of the one working cylinder and the admission of air to the air compression chamber of the other working cylinder, substantially as described.

13. In an engine, a crank shaft, two working cylinders, each provided with a gas compression chamber, pistons for said cylinders, an air compressor connected to each of said pistons, a slide valve operated from said crank shaft for each of said cylinders, ducts connecting each of said valves with the gas compression chamber and air compressor of its adjacent cylinder, and ducts connecting each valve with the gas admission valve of the adjacent cylinder and the air admission valve of the opposite cylinder.

Signed at Salem in the county of Columbiana and State of Ohio this 22nd day of November A. D. 1905.

BAXTER M. ASLAKSON.

Witnesses:
 GEO. S. COOPER,
 HERBERT BONSALL.